US009294858B2

(12) United States Patent
Root et al.

(10) Patent No.: US 9,294,858 B2
(45) Date of Patent: Mar. 22, 2016

(54) CONTROLLING ACOUSTIC ECHO CANCELLATION WHILE HANDLING A WIRELESS MICROPHONE

(71) Applicants: Timothy D Root, Nashua, NH (US); Mark Desmarais, Nashua, NH (US)

(72) Inventors: Timothy D Root, Nashua, NH (US); Mark Desmarais, Nashua, NH (US)

(73) Assignee: Revo Labs, Inc., Sudbury ( * ) Notice: Subject to any disclaimer, the term of this patent is extended or adjusted under 35 U.S.C. 154(b) by 136 days.

(21) Appl. No.: 14/282,240

(22) Filed: May 20, 2014

(65) Prior Publication Data

US 2015/0245155 A1 Aug. 27, 2015

Related U.S. Application Data

(60) Provisional application No. 61/944,775, filed on Feb. 26, 2014.

(51) Int. Cl.

| | |
|---|---|
| ***H04B 3/20*** | (2006.01) |
| ***H04R 3/02*** | (2006.01) |
| ***H04R 29/00*** | (2006.01) |
| ***H04R 3/00*** | (2006.01) |

(52) U.S. Cl.

CPC .............. *H04R 29/004* (2013.01); *H04R 3/002* (2013.01)

(58) Field of Classification Search

None

See application file for complete search history.

(56) References Cited

U.S. PATENT DOCUMENTS

2007/0009118 A1* 1/2007 Kimura .................. H04R 27/00 381/172
2008/0037802 A1* 2/2008 Posa ...................... H04N 7/142 381/77
2012/0076316 A1* 3/2012 Zhu ........................ H04R 3/005 381/71.11
2012/0120313 A1* 5/2012 Green ...................... H04B 1/04 348/485
2012/0183156 A1* 7/2012 Schlessinger ........... G06F 3/165 381/111
2013/0129102 A1* 5/2013 Li ......................... H04M 9/082 381/71.1
2013/0316752 A1* 11/2013 Bodley ................ H04L 12/1827 455/517
2013/0322639 A1* 12/2013 Cleve ........................ H04R 3/02 381/66
2013/0324167 A1* 12/2013 Bevil .................... H04M 1/725 455/458
2014/0112495 A1* 4/2014 Bodley .................... H04M 3/56 381/80
2014/0154968 A1* 6/2014 Root ...................... H04H 20/61 455/3.05
2014/0205105 A1* 7/2014 Cleve ........................ H04R 3/02 381/66
2014/0335838 A1* 11/2014 Root ................... H04L 12/1827 455/416

FOREIGN PATENT DOCUMENTS

JP 09083412 A * 3/1997

* cited by examiner

*Primary Examiner* — Thang Tran

(74) *Attorney, Agent, or Firm* — Robert Schuler

(57) ABSTRACT

An audio system has a base station, a speaker and one or more wireless microphones. The audio system operates to receive audio information from both a far-end audio source and a near-end audio source and to process the audio information for transmission to a far-end audio system. The wireless microphones have an electrically conductive element connected to a touch sensitive switch, and the electrically conductive element is proximate to an outer perimeter surface of the microphones. When the outer perimeter surface of the microphone is touched, the switch is activated which sends a microphone handling signal to the base station. The base station uses the microphone handling signal to control an operational characteristic of an audio signal processing function running on the base station.

16 Claims, 8 Drawing Sheets

AUDIO SYSTEM 200
PRIOR ART

AUDIO CONFERENCE SYSTEM 300
PRIOR ART

MICROPHONE 120

RATE CONTROL LOGIC

CONTROLLING ACOUSTIC ECHO CANCELLATION WHILE HANDLING A WIRELESS MICROPHONE

1. FIELD OF THE INVENTION

The present disclosure relates to an audio system that is able to determine that a wireless microphone is in motion, and to determination to control the operation of an acoustic echo cancellation function.

2. BACKGROUND

Audio systems having wireless microphones, some number of loud speakers and a base station are typically designed according to the application for which they are intended. One application for such a system is in a meeting room environment, where audio system microphones operate to capture acoustic energy and to send resulting audio signals to a base station that operates to control how and where the audio signals are played. In the case that the audio system is operating locally, the audio signals can be played in the same room or in another room that is local to the audio system. Another application for an audio system is in an audio conferencing environment, where a local audio system (audio conferencing system) receives and processes a local audio signal and transmits this signal over a network (LAN or WAN) to a remote audio system (audio conferencing system).

Audio conferencing systems typically include some number of microphones, at least one loudspeaker and a base station which is connected to a communication network. In such a system, microphones can operate to pick up acoustic audio signals (speech) from a near side speaker and transmit the signals to a base station which generally operates to provide session control and to process the audio signals in a number of ways before sending it to a far side communication device to be played by a loudspeaker. Among other things, the base station can be configured with functionality to amplify audio signals, it can regulate microphone signal gain (automatic gain control or AGC), suppress noise, and it can automatically remove acoustic echo present in the system.

FIG. 1 is a diagram showing components comprising an audio conference system 100. The system 100 can have a number of wireless or wired microphones 120A-120D, one or more loudspeakers 110, and an audio control and signal processing device (base station/server) 105. Typically, the device 105 is comprised of complex digital signal processing and audio signal control functionality. The audio signal control can include functionality to automatically control near side audio signal gain, functionality to control microphone sensitivity, and system mode control (duplex/half duplex modes) to name only a few, and the digital signal processing can include automatic echo cancellation (AEC) functionality, residual echo suppression functionality or other non-linear processing, noise cancellation functionality, and double talk detection and mitigation.

The AEC functionality can be an essential element in both an audio conferencing system and in a room audio system, and it generally operates to remove acoustic echo from a near side audio signal prior to the signal being transmitted to a far side system to be played. Specifically, acoustic echo occurs when a far side audio signal received and played by a near side system is picked up by a near side microphone as acoustic echo. An audio signal generated by the near side microphone that includes the acoustic echo, is then sent to the far end system where the far end talker can hear the echo. This acoustic echo is distracting and can severely degrade the quality of an audio conferencing session if it is not effectively cancelled at the near end audio conferencing system.

FIG. 2 is a diagram showing typical AEC functionality that can be implemented in the audio system 200 that is substantially similar to the audio system 100 described earlier with reference to FIG. 1. The system 200 includes a base station comprising an adaptive filter 210, a summation function 220, a loudspeaker and a microphone. In operation, a far end (F.E.) audio signal is received at the system 200 and sent to both a loudspeaker and to the adaptive filter 210 which operates to, among other things, derive an estimated echo signal which is sent to a summation function 220. The loudspeaker plays the F.E. audio signal and the microphone proximate to the loudspeaker can pick up the acoustic energy played by the loudspeaker and send it as an audio signal (microphone signal) to the summation function 220 which operates to subtract the estimated echo from the microphone signal. The output of the summation function 220 is an error signal 230, and this error signal is used as an input to an adaptive algorithm that operates to update coefficients comprising the adaptive filter. The resultant filter coefficients are an approximation of a transfer function, which models the acoustic environment between the loudspeaker and the microphone. The updated filter coefficients are used to minimize the error signal (which in the absence of any N.E. audio is ideally zero). As long as most of the audio energy in the microphone signal is comprised of F.E. audio, the adaptive filter is able to converge to a solution, which is the minimization of the error signal. However, the adaptive filter 210 may not converge within a reasonable period of time, or may never be able to converge to a solution, if N.E. audio (from a talker proximate to the microphone) is present in the microphone signal with or without F.E. audio also being present. In the case that only N.E. audio is present in a microphone signal, this audio should not be cancelled and so the coefficients associated with the adaptive filter can be frozen or the rate at which the coefficients are calculated can be retarded, this prevents the filter from diverging from a previous solution. Further, in the event that both N.E. and F.E. audio are present in a microphone signal, it is necessary that the filter is able to adapt to cancel any acoustic echo present in a microphone signal, but not attempt to adapt to the N.E. audio component of the signal. In this case, the N.E. audio can be suppressed in some manner, such as the system 100 switching to a half duplex mode of operation in which only the F.E. audio is processed by the adaptive filter. The condition in which both N.E. audio and F.E. audio are present in a microphone signal is referred to as double talk.

FIG. 3 is a diagram showing an audio conference system 300 that includes a base station comprising acoustic echo cancellation functionality 310 and a double talk detector (DTD) 320, a loudspeaker 330 and a wireless microphone 340. The DTD 320 generally operates to detect audio signal energy in a F.E. signal and a N.E. audio signal received from the microphone which it uses to determine whether or not the system should enter into the double talk mode of operation.

3. BRIEF DESCRIPTION OF THE DRAWINGS

The present invention can be best understood by reading the specification with reference to the following figures, in which.

4. CROSS REFERENCE TO RELATED APPLICATIONS

This application claims the benefit under 35 U.S.C. §119 (e) of U.S. Provisional Patent Application Ser. No. 61/944,775 entitled "CONTROLLING ACOUSTIC ECHO CANCELLATION WHILE HANDLING A WIRELESS MICROPHONE", filed Feb. 26, 2014, the entire contents of which is incorporated by reference.

5. DETAILED DESCRIPTION

Figure 3:
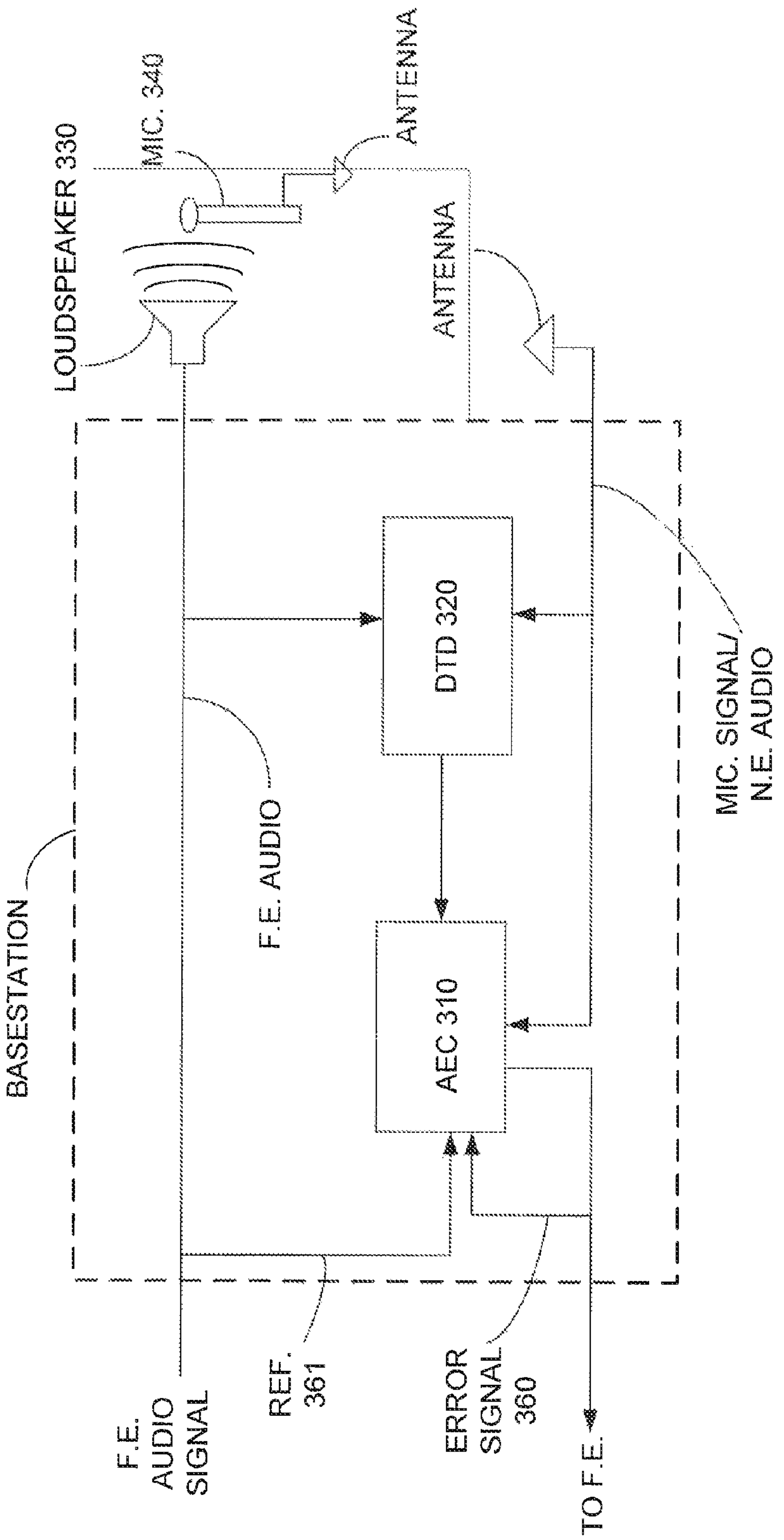
FIG. 3 is a diagram showing functional elements comprising an audio conferencing system 300 with a double talk detector.

Audio conferencing systems, such as the system 300 described with reference to FIG. 3, can be designed to support wireless microphones 340. These wireless microphones can be designed to rest upon a conference table or designed to be carried around by or attached in some manner to an individual participating in an audio session. Such wireless microphones allow a user to freely walk around a room while talking or to easily move a microphone from one position to another on a conference table. Moving a microphone around a room in this manner alters the acoustic path characteristics between a loudspeaker associated with the conferencing system and a microphone proximate to the loudspeaker. AEC 310 functionality comprising the audio conferencing system 300 generally operates to adapt to a changing acoustic environment based upon, among other things, audio information it receives in both a reference signal and an error signal, such as the reference signal 361 and error signal 360 of FIG. 3. A changing acoustic path, as the result of microphone movement for instance, can cause the error signal to become larger, which in turn causes the AEC to update its filter coefficients in order to minimize the error and cancel acoustic echo. In the presence of F.E. audio, AEC functionality typically does not permit filter coefficients to be updated prior to determining whether a double talk (DT) condition exists or not.

It is not an easy task to discriminate between F.E. audio that leaks through an adaptive filter and N.E. audio that leaks through an adaptive filter (audio that leaks through the filter in this context is referred to as residual echo). Many papers have been published and many solutions have been directed to solutions for this problem. To make matters even more complicated, in the event microphone movement is present during the time F.E. audio is received by a conferencing system, an AEC function, such as the AEC 310 in FIG. 3, is typically unable to accurately distinguish between a double talk condition and microphone movement. If due to microphone motion the AEC functionality incorrectly detects a DT condition, it will react by slowing or freezing the rate at which adaptive filter coefficients are updated, which can result in the adaptive filter function diverging from an optimal echo cancellation solution, and so the F.E. starts to hear acoustic echo.

Accordingly, it was discovered that information indicative of microphone movement can be used by an audio conferencing system to control certain operational characteristics of an audio system's acoustic echo cancellation functionality, thereby improving the quality of a N.E. audio signal sent to a F.E. audio system (whether it be a conferencing device or not). According to one embodiment of the invention, an electrically conductive element is disposed proximate to substantially an entire outer perimeter edge surface of a wireless microphone housing exterior that a user can touch in order to move the microphone from one place to another on a tabletop. The electrically conductive element is connected to a touch sensitive switch, which when activated generates a microphone handling signal that can be used by an audio system to determine that the microphone is being moved, or to determine that the microphone is being handled, but not actually moved (handling a microphone can also change the acoustic path between a loud speaker and the microphone resulting in the AEC diverging from an optimal solution). The table-top wireless microphone is designed such that it is only practical for a user to handle the microphone by touching one or more locations corresponding to the outer perimeter edge surface of the microphone housing, and the electrically conductive element is disposed proximate to substantially the entire outer perimeter edge surface. An audio system can use the microphone handling signal to control certain operational characteristics of the system, such as operating parameters associated with an acoustic echo cancellation function (rate of adaption or operating frequency spectrum, noise reduction, residual acoustic echo cancellation), the operating parameters of the microphone (gain, sensitivity) or a double talk detector. An audio system that is able to determine that a microphone is being handled (with or without motion) in this manner allows the audio conferencing system to more accurately adapt to changes in an acoustic environment resulting in a higher quality N.E. and F.E. audio signal.

Figure 1:
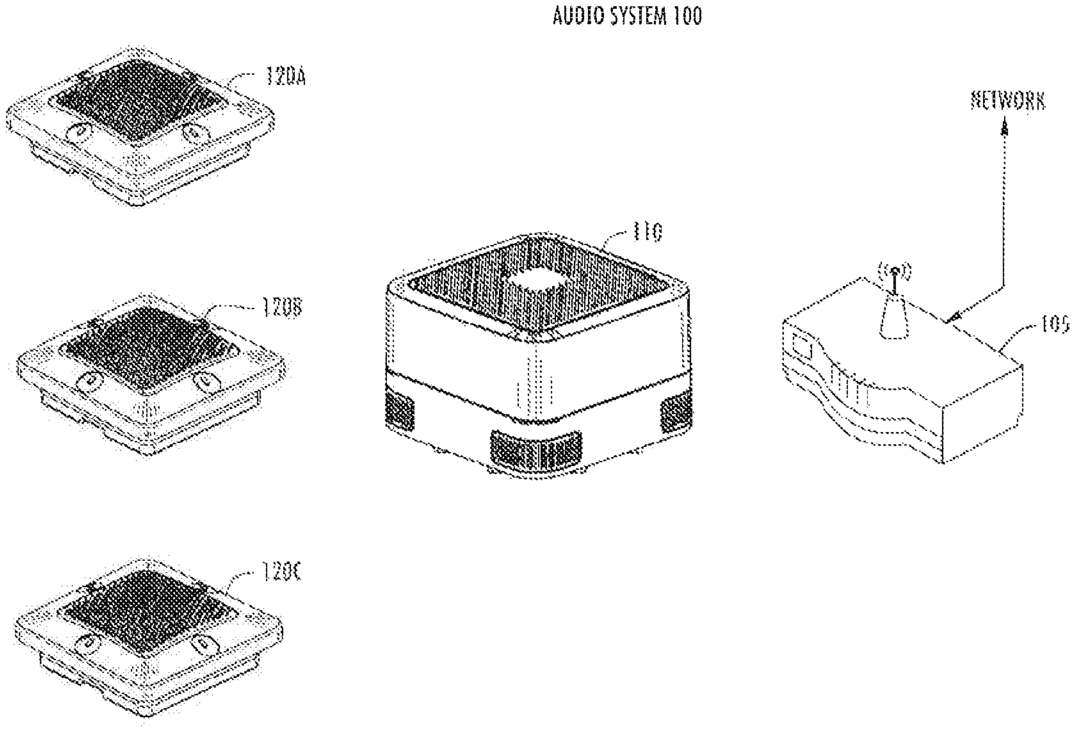
PRIOR ART FIG. 1
FIG. 1 is a diagram showing component parts comprising an audio system 100.
Figure 2:
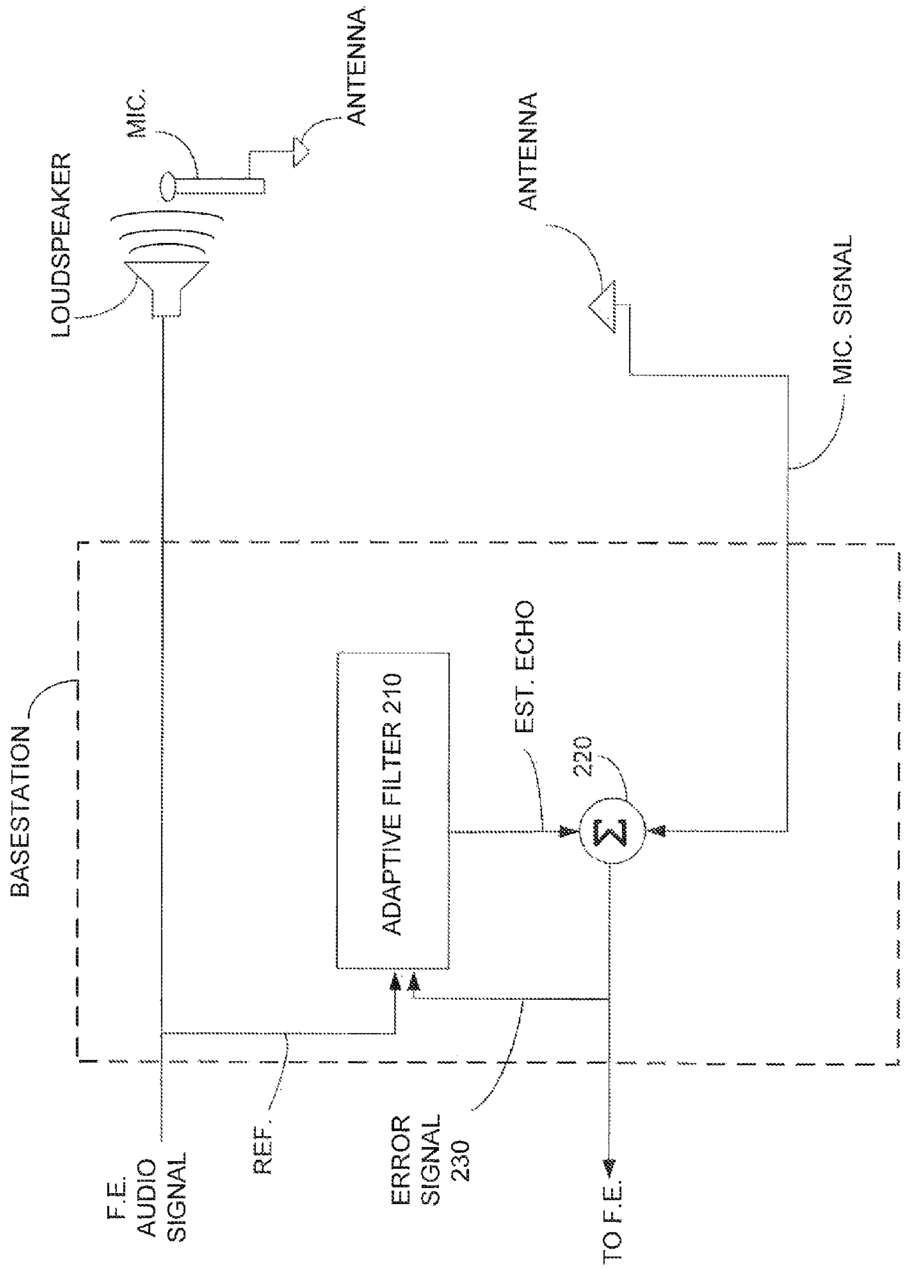
FIG. 2 is a diagram showing functional elements comprising an audio system 200.
Figure 4:
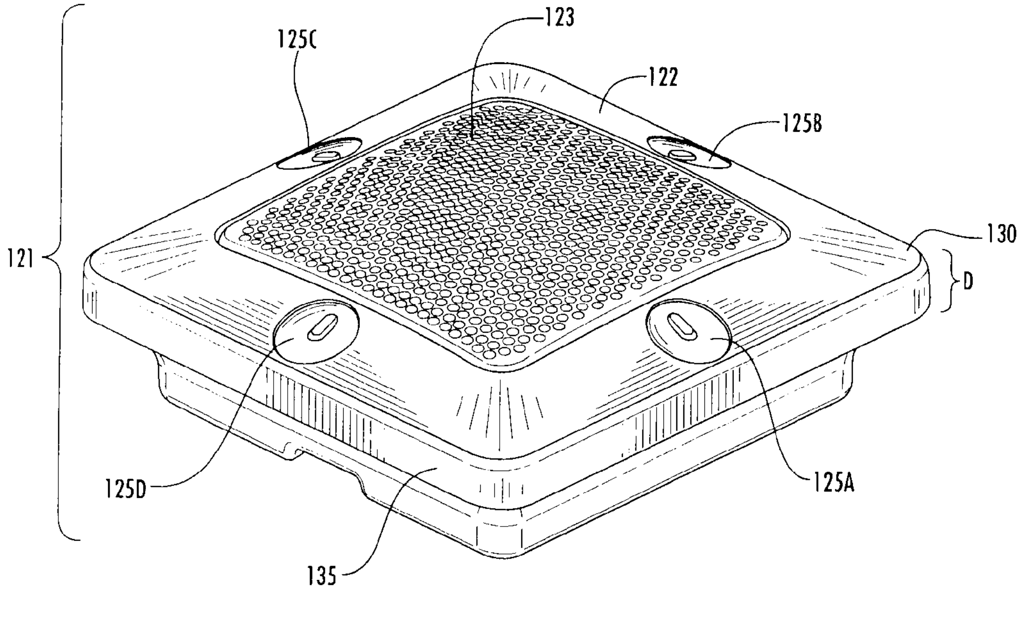
FIG. 4 is a diagram illustrating a wireless microphone 120.

FIG. 4 is a diagram showing any one of the microphones 120A-120D described earlier with reference to FIG. 1 having the outer perimeter edge surface, labeled 135, and the electrically conductive element (not shown) described earlier. The microphone 120 is comprised of a microphone housing 121 that can be composed of any appropriate lightweight material, such as a plastic material or any light weight synthetic material that can be easily molded or fabricated. The microphone housing 121 encloses a non-conductive substrate upon which are mounted functional elements necessary for the microphone operation. The non-conductive substrate and the functional elements mounted thereon will be described later with reference to FIG. 5. The housing 121 geometry according to this embodiment is substantially square in shape when viewed from a top surface 122, and the top surface 122 is slightly convex in shape when viewed from any side of the microphone. The top surface 122 of the microphone has an outer edge 130 that defines the entire outer perimeter of the top surface 122 of the microphone housing 121. A microphone perimeter edge surface 135 subtends from the entire perimeter of the outer edge 130 of the microphone, and this surface 135 has a width dimension "D" that can be of any suitable width that permits the microphone 120 to be easily handled by a user for movement from one location to another on a table top.

While FIG. 4 shows a microphone housing top surface 122 geometry that is square in shape, the geometry is not limited to only a square shape as this geometry can be round, triangular or any other shape that can be easily handled by a user for movement of the microphone. Regardless of the geometry of the microphone housing top surface, the microphone housing 121 encloses a non-conductive substrate or simply substrate 300, shown with reference to FIG. 5, upon which are mounted functional elements that are necessary for the operation of the wireless microphone 120. a touch sensitive device 306 is connected to both a conductive element or trace 310 (referred to earlier as the electrically conductive element) and controller 315. The combination of the conductive trace, touch sensitive device and the controller operate like a switch that is in the active state when the microphone is touched proximate to the conductive trace. Specifically, when the microphone perimeter surface 135 is touched by a microphone user, the electrical properties (such as a capacitance) of the conductive trace and sensor change, this change is detected by the controller 315 which determines that the sensor is active. The touch sensitive functionality can be implemented in a number of different ways, any one of which may be suitable. In one embodiment, a single switch can replace the combination of a sensor and the controller. Hereinafter, the combination of the touch sensitive device 306 and the controller 315 is be referred to as a touch sensitive switch 318 (see FIG. 6).

Figure 5:
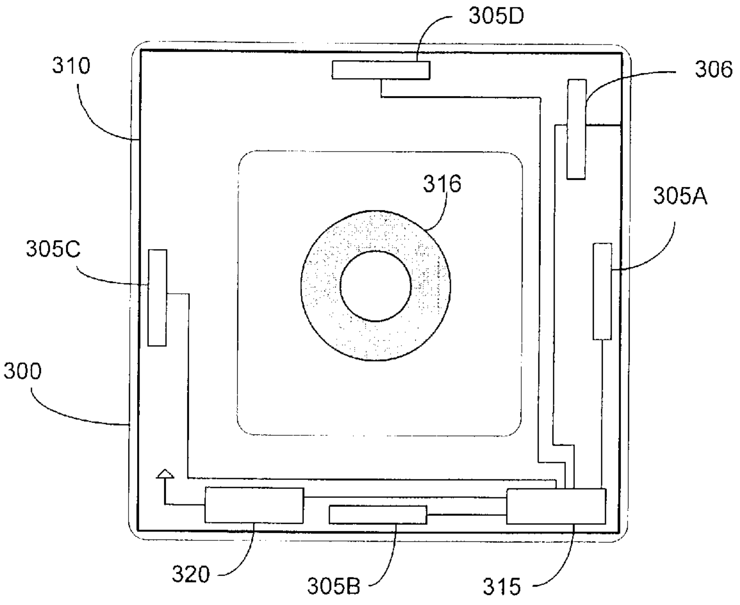
FIG. 5 is a diagram illustrating a non-conductive substrate comprising the microphone 120.

Continuing to refer to FIG. 5, the sensor 306 operates to detect the proximity of a users body to the conductive trace 310, and depending upon the sensitivity level to which the controller is set, the user may or may not need to actually come in contact with the microphone perimeter surface 135 for the switch 318 to be considered active. The term "active" according to this description means that the controller 315 detects an electrical parametric level (such as a capacitance or frequency) associated with the sensor 306 such that when the level is compared to a threshold level the switch is determined to be active. The sensitivity level of switch 318 can be set at the controller by adjusting a threshold parametric value (resistance, capacitance, frequency, conductance) to be a greater or lesser value. For a capacitive touch sensitive switch, if a switch parametric value is measured to be greater than the threshold value, then the switch is determined to be inactive, and if the measured parametric value is less than the threshold value, the switch is determined to be active. The switch parametric value can be measured at the touch sensitive device 306, or it can be measured at the controller 315. In operation, when the controller 315 determines that the microphone is being touched by a user, it generates and sends a microphone movement/handling signal to the a transceiver device 320 (DECT radio for instance) that is transmitted by the radio 320 to the base station 105 which can be used by either a local audio system or a remote audio system to control certain operational characteristics of an audio system. FIG. 5 also shows a microphone transducer 316 which operates to detect acoustic energy proximate to it and convert the acoustic energy into an audio signal that is sent to a processing device (not shown), such as a codec, that converts the audio signal into a format that permits it to be transmitted to the base station. While in this case, the transducer 316 is not attached to the substrate 300, but rather is attached to a bottom surface of the microphone 120, it is included here as it is an essential functional element of the microphone.

The substrate 300 in FIG. 5 is mounted inside the microphone housing 121 such that an outer perimeter edge 301 of the substrate 300 is very close to the perimeter surface 135 of the housing. The conductive trace 310 is fabricated as closely as possible to the outer perimeter edge of the substrate 300. Once assembled inside the housing, the trace 310 is positioned very close to the perimeter surface 135, and in this position the trace is, depending upon the sensitivity level of the switch 318 to which it is connected, able to sense whether or not a user is touching the perimeter surface 135 or not.

Figure 6:
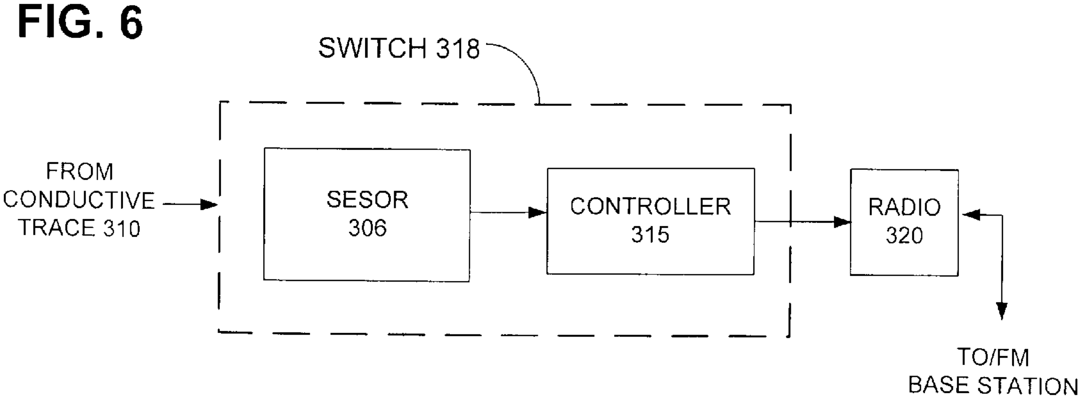
FIG. 6 is a block diagram of functional elements comprising the microphone 120.

FIG. 6 is block diagram showing functional elements comprising the microphone 120 described earlier with reference to FIG. 4. FIG. 6 shows the touch sensitive device (sensor) 306 being electrically connected to both the trace 310 and to the controller 315. According to the embodiment described with reference to FIG. 4, only a single trace 310 extends around the entire perimeter 301 of the substrate 300 and is connected to only a single touch sensitive device 306, but it should be understood that the invention is not limited to this embodiment. More than one trace can be included on the substrate, and each trace may or may not extend around the entire perimeter of the substrate. For instance, one trace can extend around a first half of the substrate perimeter and a second trace can extend around a second half of the substrate. Further, each trace may be connected to the same touch sensitive device or different touch sensitive devices. Still further, the trace may not be laid out on the substrate, rather is can be attached to an interior surface of microphone housing 121 for instance. Regardless of the conductive trace configuration, it is optimal that the trace or traces be positioned proximate to the perimeter surface 135 of the microphone.

The touch sensitive device/sensor 306 can be implemented in a device which operates to sense a capacitance inherent in the human body. According to one embodiment, this type of sensor can be implemented as an RC oscillator running at some nominal frequency, and in operation this nominal frequency will change (it will drop assuming that the added capacitance is a parallel capacitance) when the capacitance of the sensor changes due to the microphone being touched. When the sensor 306 detects that the frequency drops below a selected threshold value, the switch 318 is considered to be active, and the controller 315 will generate and send a microphone handling signal (logical one for instance) to the audio system with which the microphone is associated. A programmable or selectable frequency threshold value for the touch sensor 306 can be stored on the controller 315 and the selected threshold value for the sensor can be adjusted at the controller. The microphone handling signal can be repeatedly/periodically transmitted for as long as the switch 318 is determined to be active. Alternatively, and in another embodiment, the controller 315 can receive frequency information from the sensor 306 and determine whether the frequency is higher or lower than a threshold value (a value lower than the threshold can indicate that a sensor was touched). According to this embodiment, the controller 315 is configured with a threshold value/adjustment function that it uses to process the signals it receives from the sensor 306 in order to determine whether the switch 318 is active or not. The threshold function described below with reference to FIG. 7.

Figure 7:
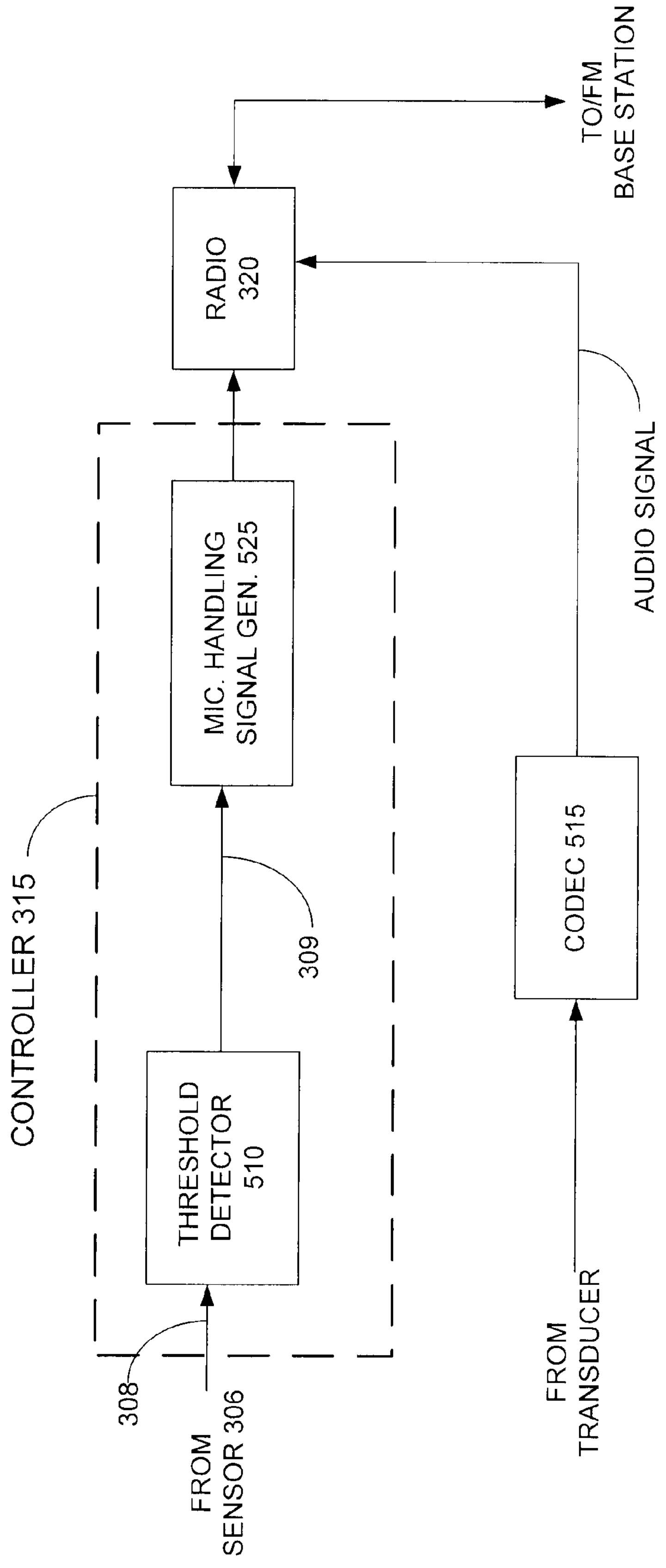
FIG. 7 is a block diagram showing the functional elements of microphone 120 in more detail.

FIG. 7 is a diagram illustrating functional elements comprising the controller 315 that can be employed to generate a microphone handling signal 317. The controller 315 is shown with a threshold detector 510 that operates to receive parametric information from the sensor 306. The threshold detector 510 can be programmed or configured with a switch activity threshold value according to the needs of the audio system with which it is associated. A threshold value in this case can be a frequency value, a capacitance value, or any other value that can be set or adjusted in relation to similar capacitive touch switches. The signal 317 is referred to hereinafter as simply the microphone handling signal, but it should be understood that this signal can be generated in the presence or absence of microphone movement. In the absence of movement, the microphone can be in contact with an individual (handling the microphone), without the individual actually moving the microphone.

Continuing to refer to FIG. 7, the threshold detector 510 operates to receive, according to one embodiment, capacitance value information 308 propagated by the touch sensitive device 306. In the event that the detector 510 determines that the capacitance value it receives from the sensor 306 indicates that the microphone is being touched or handled by a user, it can send a signal 309 to a handling signal generator 525 causing the generator to send, via the radio 320, a microphone movement signal 317 to the base station with which the microphone is associated. After receiving the microphone handling signal, the base station can use information in the signal to control certain operational characteristics of an acoustic echo cancellation (AEC) function running in an audio system, such as the audio system 300 described with reference to FIG. 3. The use of the microphone handling signal to control the operation of an AEC function with now be described with reference to FIG. 8.

The microphone handling signal 317 as described earlier with reference to FIG. 7 comprises information indicating that the microphone is currently being handled, with or without being in motion. Generally, the wireless microphone 120 transmits a microphone signal to the base station 105 that includes audio signal information. However, and according to an embodiment of the invention, this microphone signal can also include the microphone handling signal in the payload portion of the microphone signal for transmission to the base station 105. The microphone handling signal 317 information can be formatted according to any appropriate wireless signal transmission protocol format, such as the DECT signal transmission format or the WiFi signal transmission formal for instance.

Figure 8:
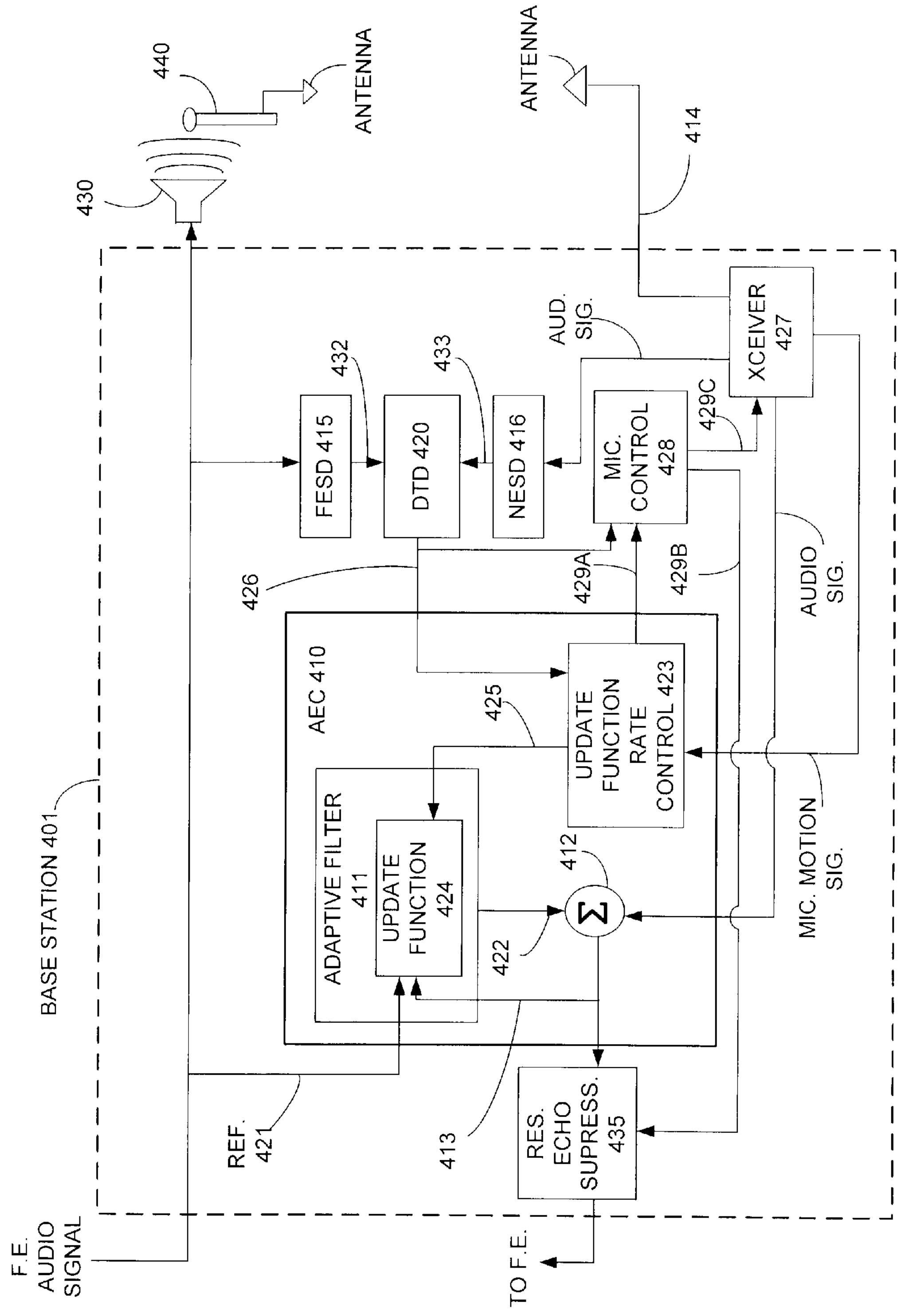
FIG. 8 is a block diagram showing functional elements comprising a conference system 400.

FIG. 8 is a block diagram showing functional elements comprising an audio system 400, that is substantially similar to the audio system 300 described earlier with reference to FIG. 3. The system 400 has a base station 401, one or more loudspeakers 430, and one or more wireless and/or wired microphones 440. The base station 401 has acoustic echo cancellation (AEC) functionality 410, a F.E. Signal Detector (FESD) 415, a N.E. Signal Detector (NESD) 416, a Double Talk Detector (DTD) 420, microphone operation control function 428, a residual echo suppression function 435 (suppression), and a transceiver 427. The AEC functionality 410 can be implemented in any appropriate digital signal processing device or devices (not shown). The FESD 415 generally operates to detect audio signal energy in a F.E. signal that is received at the system 400 and which is played by the loudspeaker 430. Information corresponding to whether or not F.E. audio signal energy is detected is sent to the DTD 420 in a signal 432. The NESD 416 generally operates to detect audio signal energy in a N.E. signal that is generated by a local audio source (talker), picked up by the microphone 440. The transceiver 427 at the base station receives the audio and motion information in a microphone signal 414, and sends the audio signal information to both the NESD 416 and the summation function 412, and sends the motion information to a filter coefficient update function (update function) rate control 423. Information corresponding to whether or not N.E. audio signal energy is detected is sent by the NESD to the DTD 420 in a signal 433. The DTD 420 generally operates on information received from both the FESD and the NESD to determine whether or not both F.E. and N.E. audio is present at the same time. If double talk is detected, the DTD 420 generates and sends a signal 426 to both a update function rate control 423 and to the microphone control 428 that includes information indicating that a double talk condition is detected. In normal operation, when the control 423 receives a signal indicating that double talk is detected, it generates and sends a rate control signal 425 to an update function 424 that causes it to slow or stop the rate at which the filter 411 adapts, otherwise, the adaptive filter 411 will diverge from a current solution which typically results in a far end listener hearing echo. The update function 424 is comprised of an appropriate adaptive algorithm that operates on audio information comprising a reference signal and an error signal to update the adaptive filter 411 coefficients. The signal 426 can be used by the microphone control 428 to generate and send a signal 429B that controls the function 435 to suppress the N.E. audio during the time that double talk is detected. Either one or both of these techniques for handling double talk can be implemented in an audio conferencing system, such as the system 400. The design and operation of a residual echo suppression function, such as the function 435 in FIG. 8, is well known to audio engineers, and so will not be described here in any detail. Generally, such residual echo suppression functionality operates on an AEC output to remove acoustic echo that bleeds through the AEC function, such as the output of the summation function 412 comprising the AEC 410 in FIG. 8.

Continuing to refer to FIG. 8, the AEC functionality 410 is comprised of, among other things, an adaptive filter 411, a summation function 412, and the update function rate control 423. The adaptive filter 411 can be a finite impulse response (FIR) filter or any other appropriate type of filter that is able to adapt to a changing acoustic environment to cancel acoustic echo. Among other things, the filter 411 is comprised of the adaptive algorithm 424 (referred to herein as the adaptive function 424) that generally operates on a reference signal 421 (which is the F.E. audio signal) and an error signal 413 (which is the output of the summation function 412) to update a plurality of adaptive filter coefficients (not shown). The output 422 of the adaptive algorithm 424 is an estimate of acoustic echo in a microphone signal 414. This echo estimate 422 is sent to the summation function 412 which operates to subtract the estimated echo from the microphone signal 414 (audio component of the microphone signal). According to one embodiment of the invention, when the rate control 423 receives a signal from the DTD 420 indicating that the DTD detects a DT condition, it checks the motion signal to determine if the microphone is currently being handled. If the microphone is being handled and the DTD detects a DT condition, the rate control 423 sends a rate control signal 425 to the adaptive function 424 which has the effect of overriding normal operation of the adaptive filter 411 to freeze it's coefficients and permits the filter 411 to adapt normally. More specifically, the update function rate control 423 is comprised of specially designed computer logic that operates to control certain operational characteristics of the AEC 410. This logic is stored in a non-transitory computer memory device (not shown) associated with the base station 401, and this logic operates to continually monitor the DTD 420 output signal 426 and microphone handling information comprising the microphone signal 414 to determine whether to generate and send a rate control signal to the filter 411 to override the normal operation of the AEC 410 during a detected DT condition.

While the logic comprising the update function rate control 423 can be designed to react to the detection of a microphone being handled by simply overriding the normal tendency of a detected DT condition to freeze the filter coefficients, therefore allowing the filter to adapt normally, the rate at which the filter adapts can be controlled according to the type or speed of detected microphone movement. For example, in the case that rapid microphone movement is detected (as the result of the microphone being dropped), then the rate control 423 can send a message to the microphone control 428 to mute the microphone 440.

Referring again to FIG. 8, in addition to the microphone control 428 receiving a signal 426 from the DTD 420, it receives a signal 429A from the rate control 423 that includes information indicative of the microphone being handled. Upon receipt of this microphone handling information, the microphone control 428 can generate and send a signal 429C to the microphone (or some other conferencing system 400 functionality) that is used to reduce the microphone sensitivity and/or reduce its gain.

It should be understood that while the DTD 420, the FESD 415 and the NESD 416 functionalities in FIG. 8 are, for the purpose of this description, illustrated to be separate from the AEC 410 functionality, they can be integrated into the AEC functionality.

According to one aspect of the invention, information comprising the microphone handling signal 317 can be used to control one or more of an operational characteristic of the audio conferencing system. The operational characteristics can be audio signal processing parameters or they can be microphone signal control parameters. The audio signal processing parameters can comprise the rate a which a filter, such at the filter 411 of FIG. 8, is controlled to adapt to cancel acoustic echo, it can be a noise suppression/reduction setting, it can be a particular frequency spectrum over which the adaptive filter operates to cancel acoustic echo, and it can be the activation of residual acoustic echo cancellation functionality. The microphone signal control parameters can comprise a microphone sensitivity setting or a microphone signal gain setting or a N.E. audio signal suppression setting.

Figure 9:
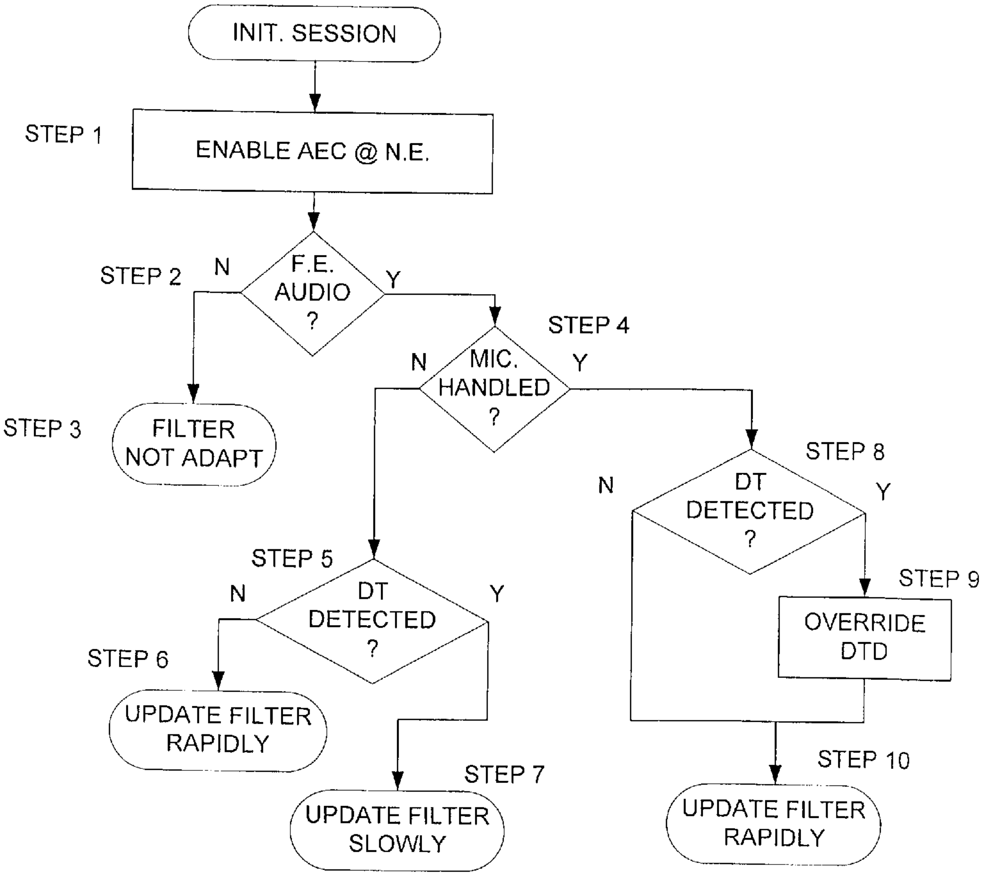
FIG. 9 is a logical flow diagram of the method of the invention.

As described earlier with reference to FIG. 8, the specially designed logic comprising the adaptive rate control function 423 operates to control the rate a which the filter 411 coefficients are updated according to handling information comprising a microphone signal 414 and information comprising a signal 426 generated by the DTD 420. For the purpose of the following description, it is assumed that microphone handling information is indicative that either a microphone is in motion or it is not in motion. Further it should be understood that while the present description refers to overriding the normal tendency of the AEC to freeze the filter coefficients such that the filter is able to adapt normally, the rate control 423 can control the rate at which the filter 411 coefficients can be updated to be any appropriate update rate, which can range from, but is not limited to, one update per second to ten updates per second. The operation of the computer logic comprising the update function rate control 423 is now described with reference to the logical flow diagram shown in FIG. 9. Prior to Step 1, an audio system such as the system 300 is turned on and a communication session is initiated, then in Step 1, the system 300 enables/initializes the AEC functionality 410 comprising the base station 401 in FIG. 8. In Step 2, if the FESD 415 does not detect F.E. audio, then the logic proceeds to Step 3 and the filter 411 coefficients are not updated. On the other hand, if in Step 2 F.E. audio is detected, then the logic proceeds to Step 4 where a determination is made (examining the microphone motion signal) whether or not the microphone is currently being handled. If the determination in Step 4 is that the microphone is not currently being handled, then the logic proceeds to Step 5, where the rate control 423 checks to see if the DTD 420 is detecting a DT condition. If in Step 5 no DT condition is detected, then the logic proceeds to Step 6 and the filter coefficients are permitted to update normally (relatively more rapid than if DT is detected). On the other hand, if in Step 5 a DT condition is detected, then the logic proceeds to Step 7 and the rate control 423 operates to slow the rate at which the filter 411 coefficients are updated (the coefficients can be frozen or they can be updated at a rate that does not allow the filter to appreciably corrupt any N.E. audio).

Returning to Step 4 in FIG. 6, if in this Step the rate control function 423 comes to the determination that the microphone is currently being handled, then the logic proceeds to Step 8 and function 423 determines whether or not the DTD 420 has identified a DT condition, and if a DT condition is detected, then in Step 9 the rate control function 423 operates to override the normal tendency of the AEC to freeze or slow the rate at which the filter 411 coefficients are updated and retunes the DTD to adapt at a faster rate. If, however, in Step 8, it is determined the a DT condition is not present, then the logic proceeds to Step 10 and the filter 411 is updated as needed to adapt to the acoustic path changes as a consequence of the microphone being moved.

The forgoing description, for purposes of explanation, uses specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of processing an audio signal in an audio conference system having a wireless microphone and a base station, the method comprising:

activating a touch sensitive switch connected to an electrically conductive element disposed proximate to an entire outer perimeter edge surface of a housing exterior of the wireless microphone, the touch sensitive switch when active operates to generate a signal indicating that the wireless microphone is being handled;

receiving acoustic audio information at the wireless microphone, and sending the acoustic audio information and the signal indicating that the wireless microphone is being handled to the base station with which the wireless microphone is associated; and controlling, by the base station using the signal indicating that the wireless microphone is being handled at least one operational characteristic of an audio signal processing means running in the base station to process the acoustic audio information.

2. The method of claim 1, wherein the audio signal processing means operates to remove acoustic echo from the acoustic audio information.

3. The method of claim 1, wherein the at least one operational characteristic of the audio signal processing means is a rate at which the audio signal processing means adapts to a changing acoustic environment proximate to the wireless microphone.

4. The method of claim 1, wherein the base station interprets the signal indicating that the wireless microphone is being handled as a possible change to an acoustic path characteristic between the wireless microphone and a loudspeaker.

5. The method of claim 1, wherein the touch sensitive switch operates to detect a change in capacitance.

6. The method of claim 5, wherein the touch sensitive switch generates a signal indicating that it is active when it detects a capacitance to be equal to a threshold level.

7. The method of claim 1, wherein the acoustic audio information comprises acoustic energy received from the environment in which the wireless microphone is operating.

8. The method of claim 1, wherein the electrically conductive element comprises a first and second electrically conductive trace, each one disposed proximate to substantially one half of the outer perimeter edge surface of the wireless microphone and both being connected to the touch sensitive switch.

9. A wireless microphone system, comprising:

a base station, a wireless microphone having a housing that encloses an acoustic energy transducer, a transceiver, and a touch sensitive guard band switch connected to a touch sensor control device and a transceiver, the microphone housing having a top surface and a top surface edge extending around its entire outer perimeter from which subtends a microphone perimeter surface, the entire perimeter surface of which is proximate to an electrically conductive element connected to the touch sensitive guard band switch that when active is an indication that an individual is handling the wireless microphone;

the wireless microphone receiving acoustic audio information and the transceiver sending a signal to the base station with which it is associated that includes the acoustic audio information and an indication that the touch sensitive guard band switch is active; and the base station having audio signal processing means with at least one operating characteristic that is controlled by the indication that the touch sensitive guard band switch is active to process the acoustic audio information.

10. The method of claim 9, wherein the audio signal processing means operates to remove acoustic echo from the audio signal.

11. The method of claim 9, wherein the at least one operational characteristic of the audio signal processing means is a rate at which the audio signal processing means adapts to a changing acoustic environment proximate to the wireless microphone.

12. The method of claim 9, wherein the base station interprets the indication that that touch sensitive guard band switch is active as a possible change to an acoustic path characteristic between the wireless microphone and a loudspeaker.

13. The method of claim 9, wherein the touch sensitive guard band switch operates to detect a change in capacitance.

14. The method of claim 13, wherein the touch sensitive guard band switch generates a signal indicating that it is active when it detects a capacitance to be equal to a threshold level.

15. The method of claim 9, wherein the acoustic audio information comprises acoustic energy received from the environment in which the wireless microphone is operating.

16. The method of claim 9, wherein the electrically conductive element comprises a first and second electrically conductive trace, each one disposed proximate to substantially one half of the outer perimeter edge surface of the wireless microphone and both being connected to the touch sensitive guard band switch.

* * * * *